United States Patent
Garg et al.

(10) Patent No.: US 7,831,859 B2
(45) Date of Patent: Nov. 9, 2010

(54) METHOD FOR PROVIDING FAULT TOLERANCE TO MULTIPLE SERVERS

(75) Inventors: Vijay K. Garg, Austin, TX (US); Vinit A. Ogale, Austin, TX (US)

(73) Assignee: The Board of Regents, University of Texas System, Austin, TX (US)

(*) Notice: Subject to any disclaimer, the term of this patent is extended or adjusted under 35 U.S.C. 154(b) by 380 days.

(21) Appl. No.: 12/140,594

(22) Filed: Jun. 17, 2008

(65) Prior Publication Data

US 2008/0320259 A1  Dec. 25, 2008

Related U.S. Application Data

(60) Provisional application No. 60/945,449, filed on Jun. 21, 2007.

(51) Int. Cl.
*G06F 11/00* (2006.01)
(52) U.S. Cl. .................. 714/6; 707/637; 707/644; 707/999.204; 711/162; 714/5
(58) Field of Classification Search ............. 714/5, 714/6; 707/637, 644, 999.204; 711/162
See application file for complete search history.

(56) References Cited

U.S. PATENT DOCUMENTS

| | | | |
|---|---|---|---|
| 5,812,751 A | 9/1998 | Ekrot et al. | |
| 6,205,526 B1* | 3/2001 | Tanuma | 711/162 |
| 6,353,878 B1* | 3/2002 | Dunham | 711/162 |
| 6,625,623 B1 | 9/2003 | Midgley et al. | |
| 6,687,849 B1* | 2/2004 | Cherf | 714/5 |
| 6,795,904 B1* | 9/2004 | Kamvysselis | 711/162 |
| 7,328,366 B2* | 2/2008 | Michelman | 714/6 |
| 7,340,646 B2* | 3/2008 | Haustein et al. | 714/20 |
| 7,437,598 B2* | 10/2008 | Zohar et al. | 714/6 |
| 7,685,460 B1* | 3/2010 | Bingham et al. | 714/6 |
| 7,698,318 B2* | 4/2010 | Fries et al. | 707/610 |
| 7,747,830 B2* | 6/2010 | Arakawa et al. | 711/161 |
| 2003/0196052 A1* | 10/2003 | Bolik et al. | 711/162 |
| 2005/0193235 A1* | 9/2005 | Sandorfi et al. | 714/6 |
| 2007/0220308 A1* | 9/2007 | Yeung et al. | 714/5 |
| 2010/0205150 A1* | 8/2010 | Prahlad et al. | 707/644 |

\* cited by examiner

*Primary Examiner*—Robert Beausoliel
*Assistant Examiner*—Joshua P Lottich
(74) *Attorney, Agent, or Firm*—Anthony P. Ng; Dillon & Yudell LLP

(57) ABSTRACT

A method for providing fault tolerance to multiple computer servers is disclosed. Basically, t backup computer servers are utilized to back up data from multiple active computer servers such that up to t faults can be tolerated. Data from the active computer servers are categorized under their respective data structure accordingly. In response to any access to data within one or more of the active computer servers, backup operations are performed on the accessed data in the t backup computer servers according to their data structures such that data with similar data structures are grouped under their respective fusible data structure within the t backup computer servers.

3 Claims, 1 Drawing Sheet

METHOD FOR PROVIDING FAULT TOLERANCE TO MULTIPLE SERVERS

RELATED APPLICATION

The present application claims priority under 35 U.S.C. §119(e)(1) to provisional application No. 60/945,449 filed on Jun. 21, 2007, the contents of which are incorporated herein by reference.

BACKGROUND OF THE INVENTION

1. Technical Field

The present invention relates to computer server data redundancy in general, and, in particular, to a method for providing fault tolerance to multiple computer servers.

2. Description of Related Art

Fault-tolerance is a major concern for distributed and parallel computer systems because distributed and parallel computing tend to have a higher number of possible points of failure. In addition, with more and more industries relying on electronic commerce, fault-tolerance for computer servers on which electronic commerce depends has becomes increasingly important.

Replication is a widely used method to achieve fault-tolerance for a distributed computer system. In order to tolerate crashes of t servers, replication requires t+1 copies of identical processes. Such approach is based on the assumption that all t+1 machines will have identical state in normal operating conditions. In case of a failure (since the assumption is that no more than t machines will fail), there will always be at least one machine available. The communications overhead of replication is minimal, but the storage space overhead can be prohibitive large.

In data storage and communication, coding theory is extensively used to recover from faults. For example, redundant array of independent disks (RAID) use disk striping and parity based schemes (or erasure code) to recover from disk faults. Network coding has been used for recovering from packet loss or to reduce communication overhead for multicast. In such applications, the data is viewed as a set of data entities such as disk blocks for storage applications and packets for network applications. By using coding theory techniques, one can get much better space utilization than, for example, simple replication. However, since such technique is oblivious to the structure of the data, the details of actual operations on the data are ignored and the coding techniques simply re-compute the entire block of data. This can result in a large communication and computational overhead that depends on the size of the data structure, making such approach impractical for applications with huge data sets.

Consequently, it would be desirable to provide an improved method for providing fault tolerance to multiple computer servers.

SUMMARY OF THE INVENTION

In accordance with a preferred embodiment of the present invention, t backup computer servers are utilized to back up data from multiple active computer servers such that up to t faults can be tolerated. Data from the active computer servers are categorized under their respective data structure accordingly. In response to any access to data within one or more of the active computer servers, backup operations are performed on the accessed data in the t backup computer servers according to their data structures such that data with similar data structures are grouped under their respective fusible data structure within the t backup computer servers.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
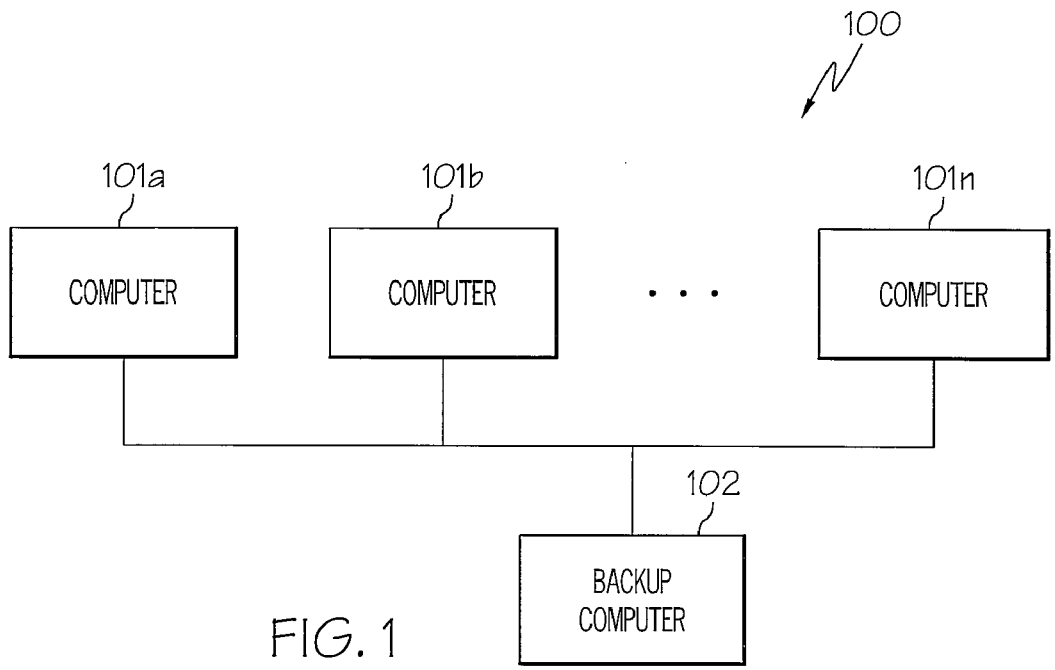
FIG. 1 is a block diagram of a multi-computer environment in which a preferred embodiment of the present invention is incorporated.

Referring now to the drawings and in particular to FIG. 1, there is depicted a block diagram of a multi-computer environment in which a preferred embodiment of the present invention is incorporated. As shown, a computer network 100 includes computers 101a-101n interconnected to each other as well as to a backup computer 102. Only one backup computer 102 is required to backup all data within computers 101a-101n. If any one of computers 101a-101n crashes due to software problem or hardware failure, the data in that computer's main memory can be re-generated using backup computer 102 along with the remaining computers of computers 101a-101n.

A data structure is a tuple having a set of nodes and some auxiliary information. The auxiliary information may be implicit or explicit and delineates the structure of the data nodes. For example, every element of an array is a node and the auxiliary information that is implicit in the definition of the array specifies that the nodes are contiguous and in a specific order. On the other hand, a linked list has explicit auxiliary data consisting of the next and previous node pointers for each node along with the heard and tail pointers of the linked list.

A data structure that can be backed up by using the method of the present invention is called a fusible data structure. Fusible data structures satisfy three main properties: recovery, space constraint and efficient maintenance. The recovery property ensures that in case of a failure, the fused structure, along with the remaining original data structures, can be used to reconstruct the failed structure. The space constraint ensures that the number of nodes in the fused structures is strictly smaller than the number of nodes in the original structures. Finally, the efficient maintenance property ensures that when any of the original data structures is updated, the fused structure can be updated incrementally using local information about the update and does not need to be entirely recomputed.

A data structure is commonly associated with a set of valid operations. For example, push and pop are the valid operations on a stack. A data structure may also have read-only operations, but they can be ignored for the purpose of backup operations because they do not affect the backup data structure. An operation on a data structure is defined as independent if the application of an operation on a fused data structure does not require a transfer of any information from a primary data structure to a back-up data structure (except the arguments of the operation).

Many commonly used data structures such as arrays, hash tables, stacks and queues are fusible. The following are examples of algorithms for fusible data structures.

I. Array-Based Stacks

When an element is pushed onto one of the source stack, $x_i$, the source stack is updated as usual, and the request is forwarded to a fused stack within a backup computer, such as backup computer 102 from FIG. 1. The fused stack does not require any additional information from $x_i$, i.e., a push operation is independent. During a pop operation, the corresponding value in y is XORed with the value that would be returned by $x_i$.pop( ).

TABLE I push

```
function x_i.push(newItem)
    x_i.array[x_i.tos] := newItem;
    x_i.tos+ +;
    y.push(i,newItem);
end function
function y.push(i,newItem)
    y.array[y.tos[i]] := y.array[y.tos[i]] ⊗ newItem;
    y.tos[i]+ +;
end function
```

TABLE II pop

```
function x_i.pop( )
    x_i.tos[i] --;
    y.pop(i,x_i.array[tos]);
return x_i.array[x_i.tos]
function y.pop(i,oldItem)
    y.tos[i] --;
    y.array[y.tos[i]] := y.array[y.tos[i]] ⊗ oldItem;
end function
```

TABLE III recovery

```
function x.recover(failedProcess)
    recoveredArray := new Array[y.array.size];
    for j = 0 to tos[failedProcess] - 1
        recItem := y.array[j];
        for each process p ≠ failedProcess
            if (j < tos[p]) recItem := recItem ⊗ x_p.array[j];
        recoveredArray[j] := recItem;
    return recoverArray,tos[failedProcess]
```

The number of elements, $n_y$, in the array corresponding to the fused stack is the maximum of $n_1, \ldots, n_k$, which is less than N. Thus, the space constraint is satisfied. Any stack $x_{failedProcess}$ can be recovered by simply XORing the corresponding elements of the other original stacks with the fused stack. Small key data may be replicated for efficiency. For example, tos may be replicated so that the push operation is completely independent.

II. Linked List-Based Data Structures

Stacks are lists that allow insertions and deletions from the same end. Queues allow insertions at one end and deletions from the other. Dequeues are a generalization of stacks and queues that allow insertions and deletions from either end. The implementations of the fusion of these three data structures are similar.

To allow arbitrary deletion or insertion, i.e., for a generic linked list, a different fused structure is used. Priority queues and sets use the general linked list algorithm. A priority queue allow arbitrary insertions and deletions at a single end. A set permits arbitrary deletions, but since the order of elements is not important, the algorithm can insert all new nodes at the best possible location, such as one of the ends.

A. Stacks

A linked list based stack is a linked list that supports inserts and deletes at only one end, such as the tail. The fused stack is basically another linked list based stack that contains k tail pointers, one for each contributing stack $x_i$.

TABLE IV push

```
function y.push(i,newItem)
    if (tail[i].next = null)
        tail[i].next := new__empty__node( );
    tail[i] = tail[i].next;
    tail[i].value := tail[i].value ⊗ newItem;
end function
```

TABLE V pop

```
function y.pop(i,oldItem)
    tail[i].value := tail[i].value ⊗ oldItem;
    oldTail := tail[i];
    tail[i] := tail[i]previous;
    if ((oldTail.next = null) ∧ (∀ j: tail[j] ≠ oldTail))
        delete__from__list (oldTail);
end function
```

B. Queues

The fusion of list based queues is more involved than stacks since both ends of the list are dynamic. Assuming that elements in a queue are inserted at the tail of any queue and only the head of a queue can be deleted.

TABLE VI insert

```
function y.insertTail(i,newItem)
    if (tail[i].next ≠ null)
        tail[i] := tail[i].next;
        tail[i].value := tail[i].value ⊗ newItem;
    else tail[i] := new__node(newItem);
    tail[i].refCount + +;
end function
```

TABLE VII delete

```
function y.deleteHead(i,oldItem)
    oldHead := head[i];
    oldHead.value := oldHead.value ⊗ oldItem;
    oldHead.refCount --;
    head[i] := oldHead.next;
    if ((oldHead.refCount = 0) delete__from__list(oldHead);
    if (head[i].refCount = 1 ∧ head[i].previous.refCount = 1)
        merge(head[i],head[i].previous);
end function
```

C. Dequeues

Dequeues are a generalization of list based stacks and queues. The reference count based fusion implementation of linked lists is extensible to a dequeue.

D. Linked Lists

The fused structure for a linked list is also valid for priority queues and sets. Linked lists can be fused together in a manner similar to queues, except that a bit array of size k can also be maintained at each node of the fused list, with a bit for every source linked list. Each bit in the array can be used to determine if adjacent nodes can be merged.

E. Hash Tables

A chained hash table can be constructed using a fixed sized array of the sets. Sets are a special case of linked lists. A chained hash table is fusible and the fusion includes an array of fused linked lists from the individual hash tables.

Figure 2:
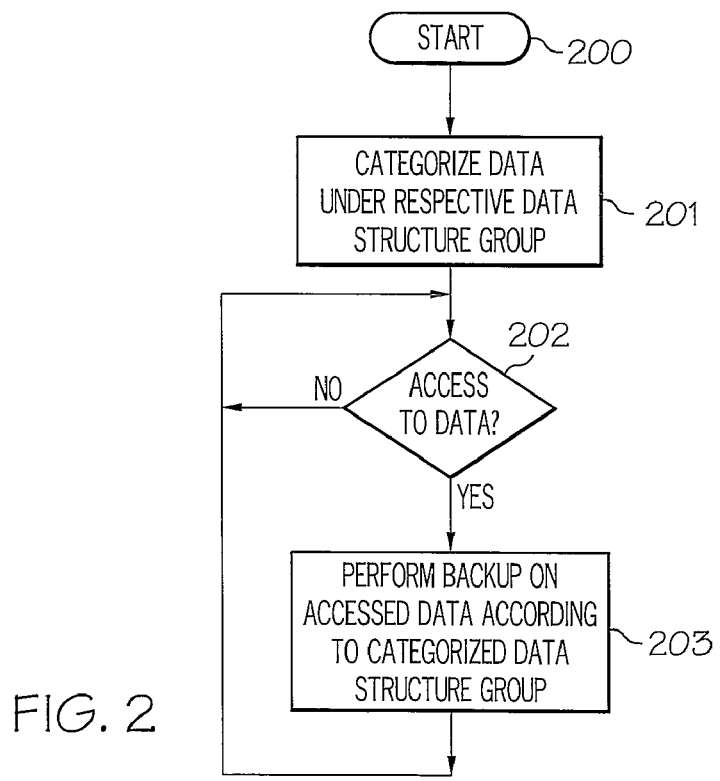
FIG. 2 is a high-level logic flow diagram of a method for providing fault tolerance to multiple computers, in accordance with a preferred embodiment of the present invention.

With reference now to FIG. 2, there is depicted a high-level logic flow diagram of a method for providing fault tolerance to computers $101a$-$101n$, in accordance with a preferred embodiment of the present invention. Starting at block 200, all data from computers $101a$-$101n$ are categorized under their respective one of a group of data structures, as shown in block 201. Examples of data structures may include queues, stacks, sets, and linked lists. A determination is made whether or not there is any access to data within one or more of computers $101a$-$101n$, as depicted in block 202. If there is no access to data within one or more of computers $101a$-$101n$, the process returns to block 202. Otherwise, if there is an access to data within one or more of computers $101a$-$101n$, a backup operation is performed on the accessed data in backup computer 102 according to the categorized data structure of the accessed data, as shown in block 203. Basically, accessed data with identical and similar data structures are grouped under their respective fusible data structure within backup computer 102.

As has been described, the present invention provides an improved method for providing fault tolerance to multiple computer servers. The present invention allows backup of data in distributed systems with greatly reduced requirements compared to existing techniques. The method of the present invention can be used in many of the applications that require fault tolerant data. Also, this opens up possibilities for fault tolerance in applications that would not be normally considered practical due to the overhead. Although only one backup server is utilized to illustrate a preferred embodiment of the present invention, it is understood by those skilled in the art that additional backup servers can be included to handle any arbitrary number of faults.

It is also important to note that although the present invention has been described in the context of fully-functional computer systems, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing fault tolerance to multiple computer servers, said method comprising:
   utilizing t backup computer servers to backup data from a plurality of active computer servers in order to tolerate up to t faults in said active computer servers;
   categorizing data from said plurality of active computer servers under their respective one of plurality of data structures; and
   in response to any access to data within one or more of said plurality of active computer servers, performing backup operations on said accessed data in said t backup computer servers according to their data structures, wherein similar data structures are grouped under their respective fusible data structure within said t backup computer servers.

2. A computer recordable type medium having a computer program product for providing fault tolerance to multiple computer servers, said computer recordable type medium comprising:
   instructions for utilizing t backup computer servers to backup data from a plurality of active computer servers in order to tolerate up to t faults in said active computer servers;
   instructions for categorizing data from said plurality of active computer servers under their respective one of plurality of data structures; and
   instructions for, in response to any access to data within one or more of said plurality of active computer servers, performing backup operations on said accessed data in said t backup computer servers according to their data structures, wherein similar data structures are grouped under their respective fusible data structure within said t backup computer servers.

3. An apparatus for providing fault tolerance to multiple computer servers, said apparatus comprising:
   t backup computer servers for backing up data from a plurality of active computer servers in order to tolerate up to t faults in said active computer servers;
   means for categorizing data from said plurality of active computer servers under their respective one of plurality of data structures; and
   means for, in response to any access to data within one or more of said plurality of active computer servers, performing backup operations on said accessed data in said t backup computer servers according to their data structures, wherein similar data structures are grouped under their respective fusible data structure within said t backup computer servers.

* * * * *